United States Patent
Brock et al.

(10) Patent No.: US 9,562,204 B2
(45) Date of Patent: Feb. 7, 2017

(54) METHOD AND APPARATUS FOR PELLETIZING BLENDS OF BIOMASS MATERIALS FOR USE AS FUEL

(71) Applicant: Astec, Inc., Chattanooga, TN (US)

(72) Inventors: J. Donald Brock, Chattanooga, TN (US); Malcolm L. Swanson, Chickamauga, GA (US)

(73) Assignee: Astec, Inc., Chattanooga, TN (US)

(*) Notice: Subject to any disclaimer, the term of this patent is extended or adjusted under 35 U.S.C. 154(b) by 563 days.

(21) Appl. No.: 14/061,865

(22) Filed: Oct. 24, 2013

(65) Prior Publication Data

US 2014/0082998 A1 Mar. 27, 2014

Related U.S. Application Data

(63) Continuation-in-part of application No. 13/616,184, filed on Sep. 14, 2012, now Pat. No. 9,127,227.

(60) Provisional application No. 61/718,282, filed on Oct. 25, 2012.

(51) Int. Cl.
*C10L 5/44* (2006.01)
*C10L 5/36* (2006.01)

(52) U.S. Cl.
CPC ............... *C10L 5/447* (2013.01); *C10L 5/363* (2013.01); *C10L 5/44* (2013.01); *Y02E 50/10* (2013.01); *Y02E 50/15* (2013.01); *Y02E 50/30* (2013.01)

(58) Field of Classification Search
CPC ............. C10L 5/363; C10L 5/44; C10L 5/447; C10L 9/083; C10B 1/10; C10B 47/30; C10B 39/04; C10B 39/10

USPC ... 44/589, 590, 606, 635; 201/5, 21, 22, 39; 202/95, 96, 131, 227; 432/114
See application file for complete search history.

(56) References Cited

U.S. PATENT DOCUMENTS

| | | |
|---|---|---|
| 3,177,932 A | 4/1965 | Smith, Jr. |
| 3,367,844 A * | 2/1968 | Cremer .................. C10B 39/10 202/227 |
| 3,553,849 A | 1/1971 | Carrier et al. |
| 3,777,810 A | 12/1973 | Phillips |
| 3,800,865 A | 4/1974 | Onarheim et al. |
| 3,822,651 A | 7/1974 | Harris et al. |
| 3,958,623 A | 5/1976 | Vissers et al. |
| 4,074,751 A | 2/1978 | Ducasse |
| 4,301,860 A | 11/1981 | Pozzi |
| 4,353,413 A | 10/1982 | Allen et al. |

(Continued)

OTHER PUBLICATIONS

International Search Report and Written Opinion of International Searching Authority for Corresponding PCT Application, (Dec. 6, 2012).

(Continued)

*Primary Examiner* — Jill Warden
*Assistant Examiner* — Joye L Woodard
(74) *Attorney, Agent, or Firm* — Chambliss, Bahner & Stophel, P.C.

(57) ABSTRACT

An assembly for processing green biomass materials from two separate feed sources for use as a fuel pellet includes a drying assembly, a torrefaction assembly and a heating assembly. The drying assembly is adapted to convert the green biomass material obtained from a first source to white biomass material. The torrefaction assembly is adapted to convert green biomass material obtained from a second source to torrefied biomass material. The heating assembly provides heat for both the drying assembly and the torrefaction assembly.

16 Claims, 15 Drawing Sheets

(56) References Cited

U.S. PATENT DOCUMENTS

| | | | |
|---|---|---|---|
| 4,401,436 | A | 8/1983 | Bonnecaze |
| 4,482,253 | A | 11/1984 | Golobic et al. |
| 5,216,821 | A | 6/1993 | McCabe et al. |
| 5,217,578 | A | 6/1993 | Taciuk et al. |
| 5,555,639 | A | 9/1996 | Livingston et al. |
| 6,209,225 | B1 | 4/2001 | Villarroel et al. |
| 6,415,527 | B1 | 7/2002 | Rasanen et al. |
| 7,654,011 | B2 | 2/2010 | Ronning et al. |
| 7,758,235 | B1 | 7/2010 | Collette |
| 2003/0192693 | A1 | 10/2003 | Wellington |
| 2003/0221363 | A1 | 12/2003 | Reed |
| 2006/0107587 | A1 | 5/2006 | Bullinger et al. |
| 2007/0266623 | A1 | 11/2007 | Paoluccio |
| 2008/0201980 | A1 | 8/2008 | Bullinger et al. |
| 2008/0229610 | A1 | 9/2008 | Ronning |
| 2009/0056206 | A1 | 3/2009 | Gauthier et al. |
| 2009/0084029 | A1 | 4/2009 | Bergman |
| 2010/0101141 | A1 | 4/2010 | Shulengerger et al. |
| 2010/0124583 | A1 | 5/2010 | Medoff |
| 2010/0162619 | A1 | 7/2010 | Peus |
| 2010/0242351 | A1 | 9/2010 | Causer |
| 2010/0300368 | A1 | 12/2010 | Myers et al. |
| 2011/0179700 | A1 | 7/2011 | Monroe et al. |
| 2011/0252698 | A1 | 10/2011 | Camper et al. |
| 2011/0258914 | A1 | 10/2011 | Banasiak et al. |
| 2011/0265373 | A1 | 11/2011 | Thorn et al. |
| 2011/0297885 | A1 | 12/2011 | Boerrigter et al. |
| 2011/0300269 | A1 | 12/2011 | Dale et al. |
| 2012/0017499 | A1 | 1/2012 | Leonhardt |
| 2012/0066967 | A1* | 3/2012 | Rinker .............. C10B 49/02 44/591 |
| 2012/0110896 | A1 | 5/2012 | Coronella et al. |
| 2012/0159842 | A1 | 6/2012 | Teal et al. |
| 2012/0160658 | A1 | 6/2012 | Bartek et al. |

OTHER PUBLICATIONS

Robert H. Perry, Perry's Chemical Engineers' Handbook, Sixth Edition, McGraw-Hill Book Company, United States, (1984).
Louisville Dryer Company, web page, (Feb. 10, 2012).
Chris Hopkins, What is Woody Biomass Energy and What Will it Mean to Forestry in North Carolina, NC Cooperative Extension, pp. 1-5.
Mark Jan Prins, Thermodynamic Analysis of Biomass Gasification and Torrefaction, pp. 1-155, (Feb. 16, 2005).
International Search Report and Written Opinion of International Searching Authority for Corresponding PCT Application, (Oct. 25, 2012).
Brown, "Development of a lab-scale auger reactor for biomass fast pyrolysis and process optimization using response surface methodology." Iowa State University (2009).
Hugo, "Pyrolysis of sugarcane bagasse." Thesis (MScEng (Process Engineering)), University of Stellenbosch (2010).
Boyd, "Mass & Energy Balance for Torrefield Pellett Production." UBC Biomass Pelletization Workshop (May 18, 2011).
Bergman et al., "Torrefaction for biomass co-firing in existing coal-fired power stations Biocal." ECN-C-05-013, ECN Biomass (Jul. 2005).
Tumuluru et al., Review on Biomass Torrefaction Process and Product Properties and Design of Moving Bed Torrefaction System Model Development, 2011 ASABE Annual Int'l Meeting.
Peng, "A study of softwood torrefaction and densification for the production of high quality wood pellets", a thesis submitted . . . (Jul. 2012).

* cited by examiner

METHOD AND APPARATUS FOR PELLETIZING BLENDS OF BIOMASS MATERIALS FOR USE AS FUEL

CROSS-REFERENCE TO RELATED APPLICATION

This application is a continuation in part of U.S. patent application Ser. No. 13/616,184 that was filed on Sep. 14, 2012, now U.S. Pat. No. 9,127,227. In addition, this application claims the benefit of U.S. Provisional Patent Application No. 61/718,282 which was filed on Oct. 25, 2012.

FIELD OF THE INVENTION

The present invention relates generally to an assembly of components that may be employed to process biomass materials for use as fuel. More particularly, the invention relates to a method and apparatus for blending torrefied biomass with white biomass for subsequent pelletization.

BACKGROUND OF THE INVENTION

Nature has created a variety of biomass materials with various characteristics. However, all biomass materials are generally comprised of cellulose, hemicellulose and lignin. In particular, the category of biomass generally known as "wood" is comprised of approximately ⅓ by weight cellulose, approximately ⅓ by weight hemicellulose and approximately ⅓ by weight lignin. Because of the relatively high cost of fossil fuels and a desire to use more renewable resources, there is great interest in using biomass as a fuel. In addition, the use of wood waste from construction and demolition activities (C&D materials) in the preparation of a fuel product reduces the amount of material that is deposited in landfills and can comprise a valuable use of an otherwise useless material.

"Green" or unprocessed biomass is low in sulfur but has a relatively high moisture content and a relatively low heating value per unit of weight, when compared to coal, for example. Consequently, in order to create an efficient biomass-to-energy conversion, it is known to dry biomass materials and/or to torrefy biomass materials for subsequent densification. Drying of biomass materials will generally reduce the moisture content from 30-50% by weight in the green state (15-25% for C&D materials) to about 5-12% by weight, and it will increase the heating value per unit of weight because of the loss of moisture weight. However, drying will not impart significant chemical changes to the biomass materials. Further heating under controlled conditions results in torrefaction, which may be generally described as a pyrolysis or thermal degradation process carried out on wood or other biomass materials at temperatures typically less than about 600° F. in a low-oxygen atmosphere. During torrefaction, the hemicellulose in the biomass is broken down into volatile organic compounds ("VOCs") such as methanol, formaldehyde and acetaldehyde, and at least a portion of these volatile organic compounds are released by evaporation. The removal of hemicellulose increases the energy density or heating value per unit of weight of the biomass; however, full torrefaction without recovery of the evaporated volatile organic compounds results in the loss of the energy stored therein.

A pelletized form of dried or torrefied wood or biomass is highly desirable in that it would allow easy and relatively clean handling and more efficient shipment, especially ocean freight shipment, of a biomass-based fuel. It is known to make fuel pellets from dried wood, and many attempts have been made to form fuel pellets of torrefied wood and biomass. However, the inventors have found that blends of dried and torrefied biomass materials can be pelletized to produce stable pellets of high durability. Furthermore, the inventors have devised a process that employs parallel processing of dried and torrefied biomass in such a way as to increase the energy efficiency of the process.

ADVANTAGES OF THE INVENTION

Among the advantages of the present invention is that it provides a method and apparatus for making stable fuel pellets from blends of dried and torrefied biomass materials. Another advantage of the invention is that it may be employed to produce a fuel pellet from such blends that has heating values similar to that of coal, as well as high grindability, structural stability, and moisture resistance. Furthermore, the preferred apparatus used in processing the dried and torrefied biomass materials uses energy produced or released in the processing of biomass materials and consequently minimizes the need for added sources of energy.

Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. The steps of all methods described herein can be performed in any suitable order unless otherwise specified herein or clearly indicated by context.

The use of any and all examples or exemplary language (e.g., "such as") herein is intended merely to better illuminate the invention and not to place a limitation on the scope of the invention, unless otherwise indicated by the claims. Nothing in the specification should be construed as indicating any non-claimed element as essential to the practice of the invention.

Several terms are specifically defined herein. These terms are to be given their broadest possible construction consistent with such definitions, as follows:

The terms "biomass" and "biomass materials" refer to plant matter in solid form, including but not limited to grasses, plant stalks, fibers and leaves, bark, wood chips and sawdust.

The terms "green biomass" and "green biomass materials" refer to biomass materials that have been processed to reduce their particle size.

The term "green wood chips" refers to materials obtained from trees and other woody plants that have been processed to reduce their particle size.

The terms "construction and demolition materials" and "C&D materials" refer to wood products of various types and forms that have been obtained from construction and/or demolition projects.

The term "C&D chips" refers to C&D material that has been processed to reduce its particle size to approximately ½ inch or less.

The term "green wood" refers to green wood chips and/or C&D chips that have been processed to reduce their particle size to approximately ½ inch or less.

The term "wood chips" includes green wood chips and C&D chips.

The terms "white biomass" and "white biomass materials" refer to green biomass materials that have been dried to increase their heating value per unit of weight.

The term "white wood" refers to green wood that has been processed to increase its heating value per unit of weight, but not above 8900 BTU/lb.

The terms "torrefied biomass" and "torrefied biomass materials" refer to biomass materials that have been processed to increase their heating value per unit of weight by breaking down the hemicellulose in the biomass into volatile organic compounds.

The term "torrefied wood" refers to biomass comprising wood chips that have been processed to increase their heating value per unit of weight by breaking down the hemicellulose in the biomass into volatile organic compounds.

The term "lightly torrefied wood" and similar terms refer to biomass comprising wood chips that have been processed in a torrefaction process to increase their heating value to a level within the range of about 8900 BTU/lb to about 9500 BTU/lb.

The term "fully torrefied wood" and similar terms refer to biomass comprising wood chips that have been processed in a torrefaction process to increase their heating value to a level within the range of about 9500 BTU/lb to about 12000 BTU/lb.

SUMMARY OF THE INVENTION

The invention comprises a method and apparatus for processing green biomass materials for pelletizing into a fuel pellet. More particularly, the invention comprises a pair of parallel processing systems for preparing white biomass materials and torrefied biomass materials for blending prior to pelletizing.

A preferred embodiment of the white biomass preparation system includes a predryer, a biomass dryer and a hammermill, and a preferred embodiment of the torrefied biomass preparation system includes a torrefaction reactor, a spray cooler and a hammermill. Heat is supplied to both systems by a heating assembly which includes a burner, a heat exchanger having a plurality of heat transfer coils therein and a combustion chamber that is operatively connected between the burner and the heat exchanger. The heating assembly is configured and arranged so that the burner may be operated to heat a thermal fluid in the heat transfer coils to a temperature of up to about 550° F.

The torrefied biomass preparation system will operate in such a way that volatile organic compounds are stripped from the off gases of the torrefaction reactor. A fuel control mechanism that is a part of the heating assembly may be operated to control the supply of external fuel to the burner at a first rate when the assembly is first placed into operation. Then, as volatile organic compounds are stripped from the biomass materials in the torrefaction reactor and are conveyed to the combustion chamber, the rate of supply of external fuel to the burner may be reduced to a second rate that is lower than the first rate. It is contemplated that, depending on the type of biomass materials introduced into the white biomass preparation system and the torrefaction system, and the temperature of operation and rate of rotation of the biomass dryer and the torrefaction reactor, the supply of external fuel to the burner may be shut off and continued heat supplied to the combustion chamber by the incineration of volatile organic compounds therein.

In order to facilitate an understanding of the invention, the preferred embodiment of the invention and the best mode known by the inventors for carrying out the invention are illustrated in the drawings, and a detailed description thereof, as well as a description of presently contemplated alternatives, follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements, components and steps of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and in which.

DESCRIPTION OF THE PREFERRED EMBODIMENTS OF THE INVENTION

Figure 1:
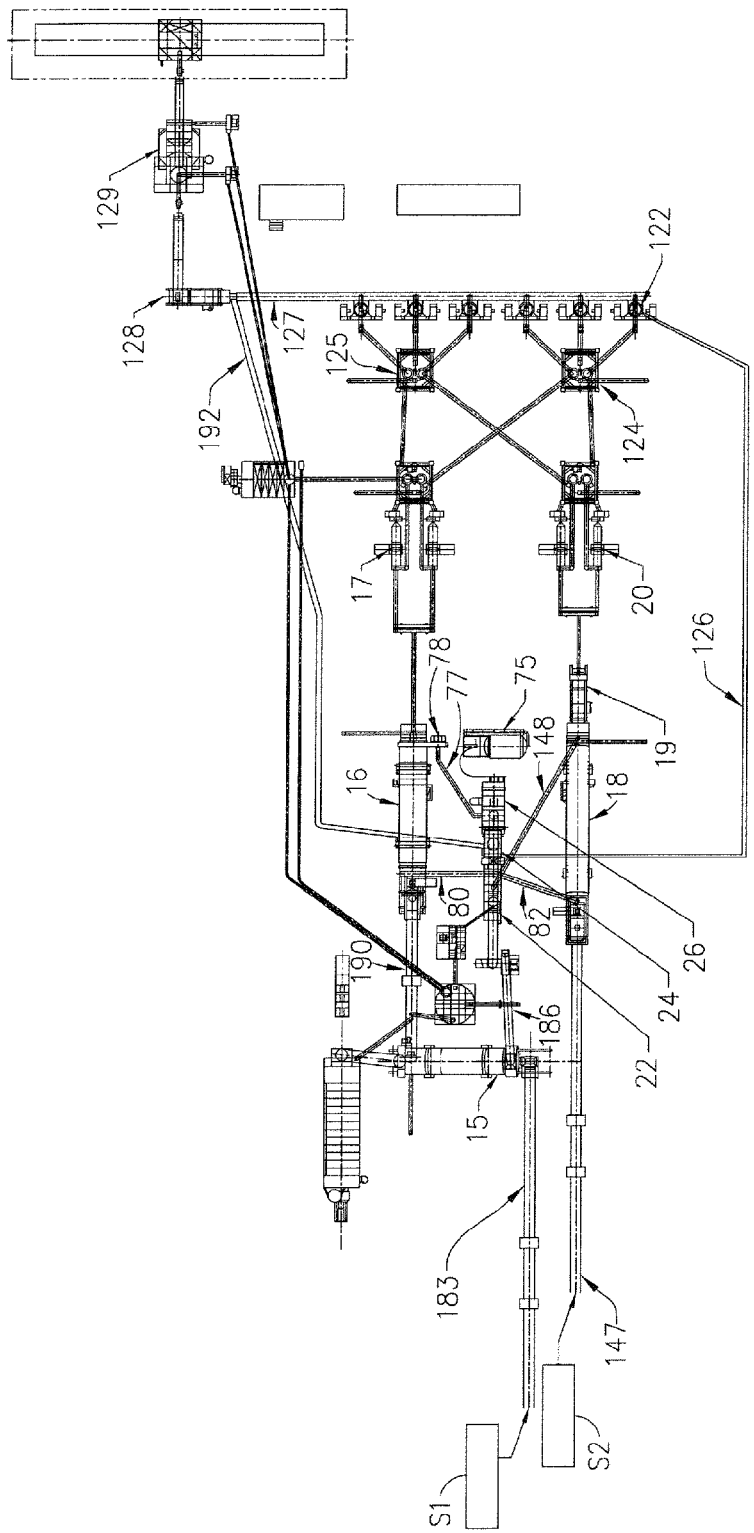
FIG. 1 illustrates the layout for a preferred embodiment of a plant for producing pellets from blends of white wood and torrefied wood according to the invention.

The drawings illustrate preferred embodiments of a plant for producing fuel pellets from blends of white and torrefied biomass materials. Parallel processing streams are shown therein, one for the preparation of white biomass material that is supplied from a first feed stream and the other for the preparation of torrefied biomass material that is supplied from a second feed stream. In one embodiment of the invention, the feed material for the white biomass preparation system has a higher moisture content than that for the torrefied biomass preparation system. For example, the embodiment of the invention illustrated in the drawings may be operated to prepare white wood from a first source S1 of green wood chips having a moisture content of about 30-50% by weight, while simultaneously preparing torrefied wood from a second source S2 of C&D chips having a moisture content of about 15-25% by weight. Subsequently, the white wood and the torrefied wood may be blended together for use in producing fuel pellets.

Thus, as shown in the drawings, the preferred white biomass preparation system includes predryer 15, biomass dryer 16 and first hammermill 17, and the preferred torrefied biomass preparation system includes torrefaction reactor 18, spray cooler 19 and second hammermill 20. Heat is supplied to both systems by heating assembly 21 which includes burner 22, heat exchanger 26 (identified as thermal oil heater in FIG. 1) having a plurality of heat transfer coils 32 therein, and combustion chamber 24 that is operatively connected between the burner and the heat exchanger. The heating assembly is configured and arranged so that the burner may be operated to heat a thermal fluid in the heat transfer coils to a temperature of up to about 550° F.

Figure 2:
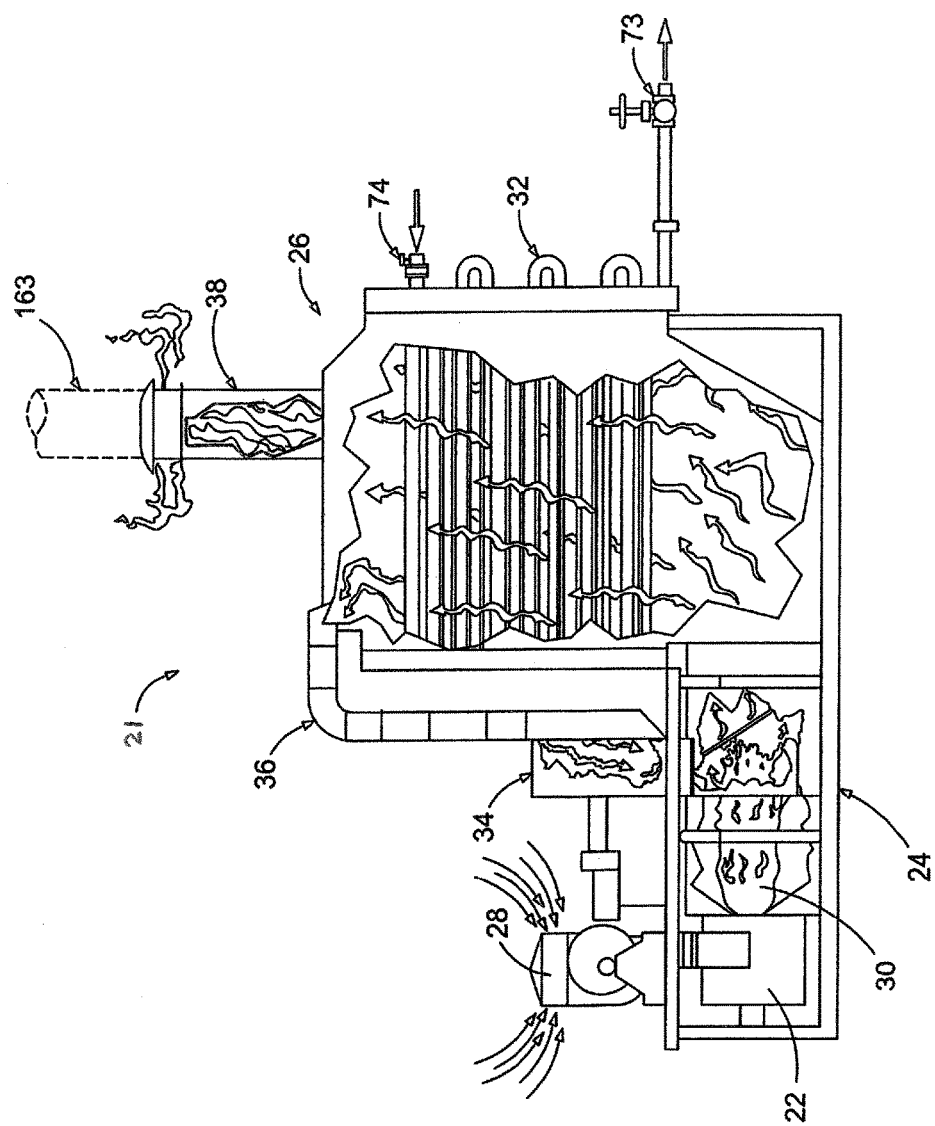
FIG. 2 is a partial sectional view of a first embodiment of the heating assembly of the plant illustrated in FIG. 1.

Burner 22 is of a conventional type having air inlet 28 and is adapted to burn fuel such as natural gas, propane, pulverized coal, fuel oil or the like. As best shown in FIG. 2, burner 22 produces flame 30 in combustion chamber 24, heating air that passes into heat exchanger 26. Heat exchanger 26 includes a plurality of heat transfer coils 32 therein, which coils are adapted to receive a thermal fluid such as thermal oil. Combustion chamber 24 is operatively connected between the burner and the heat exchanger so that air heated in the combustion chamber by the burner may be conveyed into the heat exchanger, where it will heat the thermal fluid in heat transfer coils 32. Heat exchanger 26 is equipped with a recirculation fan (not shown) that is mounted in housing 34 and operates to draw heated air from heat exchanger 26 through recirculation duct 36 and into combustion chamber 24 for further heating. Heat exchanger 26 also includes exhaust stack 38. Preferably, the heating assembly will be operated to generate up to 20 million BTUs per hour to heat the thermal fluid within heat transfer coils 32 to a temperature of up to about 550° F.

Thermal fluid within heat transfer coils 32 is conveyed to biomass dryer 16 and torrefaction reactor 18 in a fluid circuit to be described hereinafter. The heating assembly includes controls such as are known to those having ordinary skill in the art to control the rate of flow of thermal fluid to the biomass dryer and the rate of flow of thermal fluid to the torrefaction reactor. In the preferred embodiment of the invention, these controls are operated, and the rotation and feed of material into the biomass dryer and the torrefaction reactor are controlled, to insure that the thermal fluid in the biomass dryer will heat green biomass material therein (or pre-dried biomass material, as described hereinafter) to a temperature within the range of 200° F. to 240° F., while the thermal fluid in the torrefaction reactor will heat green biomass material therein to a temperature within the range of 475° F. to 550° F. The preferred heating assembly is the Convectec™ heater that is manufactured and sold by Heatec, Inc. of Chattanooga, Tenn.

Figure 3:
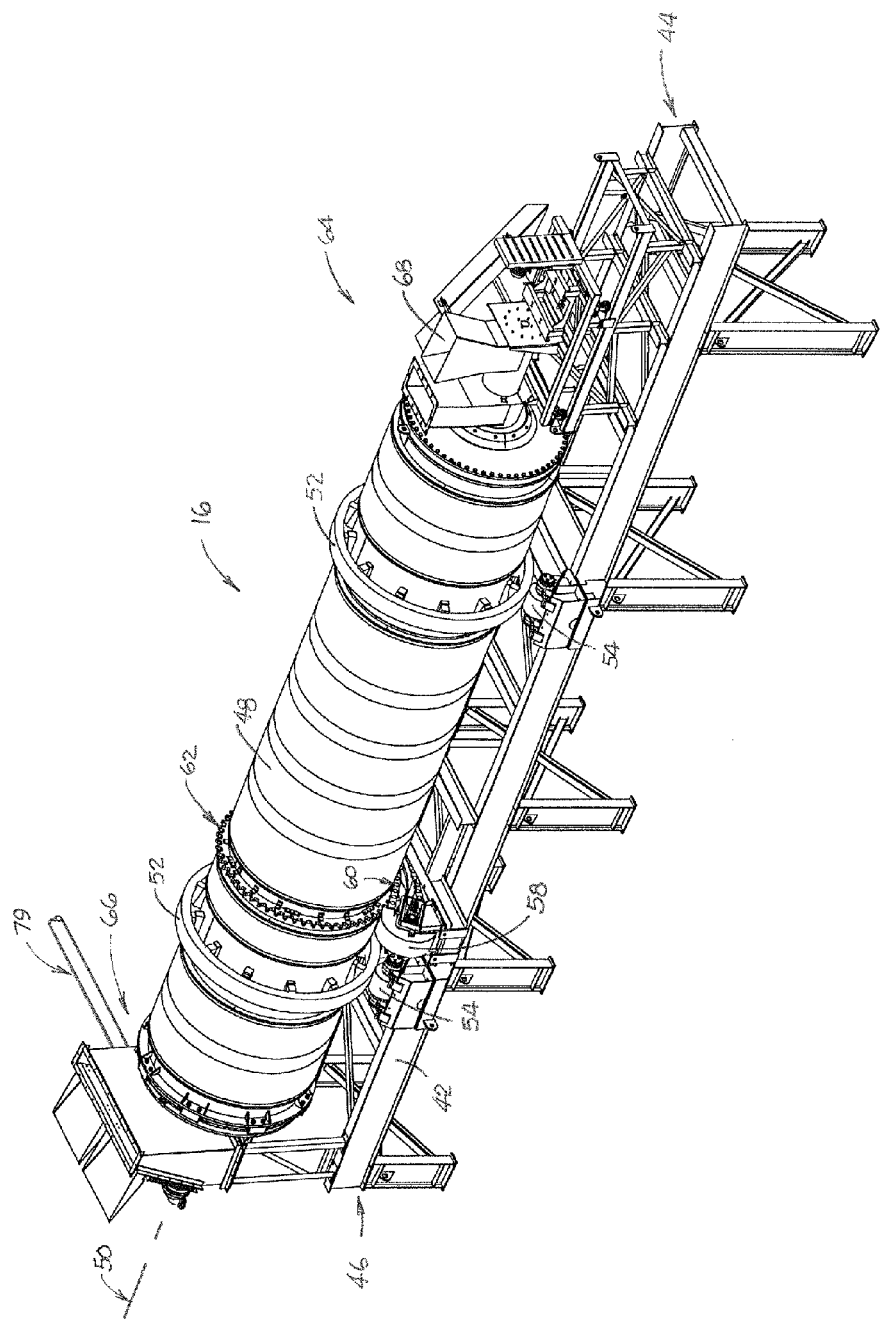
FIG. 3 is a perspective view of the preferred biomass dryer of the plant illustrated in FIG. 1.
Figure 4:
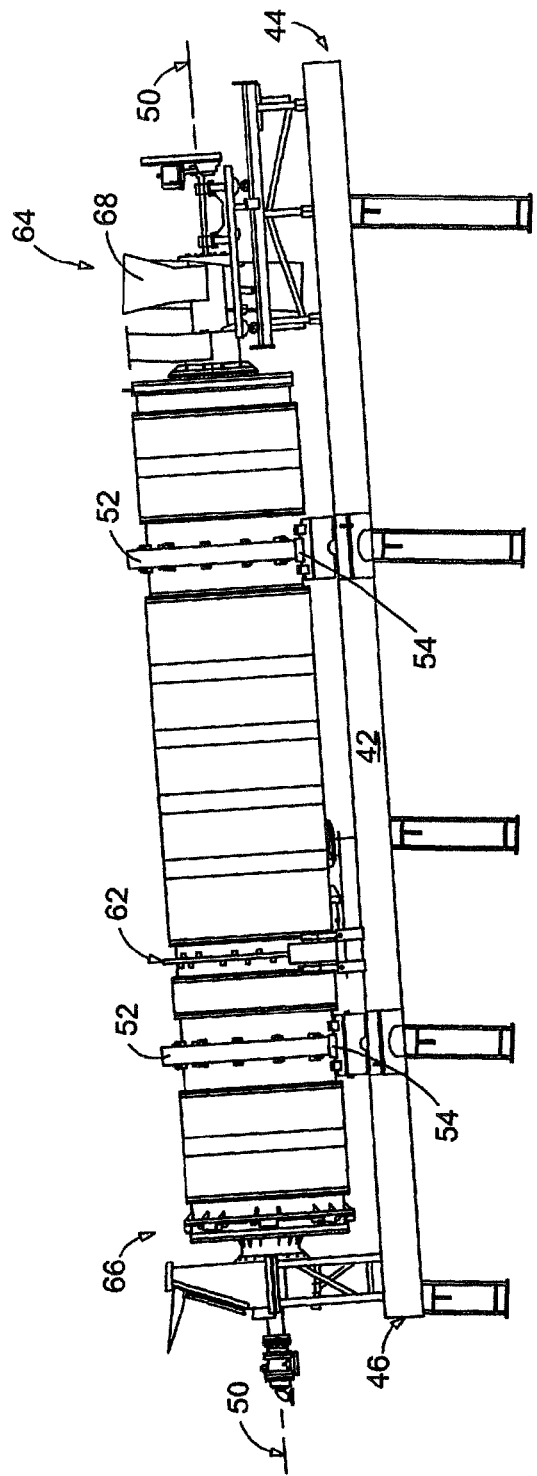
FIG. 4 is a side view of the preferred biomass dryer of FIG. 3.

Biomass dryer 16 includes dryer frame 42 (shown in FIGS. 3-5) having upper end 44 and lower end 46. Generally cylindrical dryer drum 48 is mounted on dryer frame 42 for rotation about axis 50 (best shown in FIG. 4). Dryer drum 48 includes a pair of outer rings 52 that engage trunnions 54 on dryer frame 42. A motor (not shown) is adapted to rotatably drive a sprocket (not shown, but located in housing 58) that is in driving engagement with drive chain 60 which engages sprocket 62 mounted on the outer surface of the drum to rotate dryer drum 48 in a conventional manner. Alternative drive systems such as are known to those having ordinary skill in the art to which the invention relates may also be employed to rotate dryer drum 48 with respect to dryer frame 42.

Figure 5:
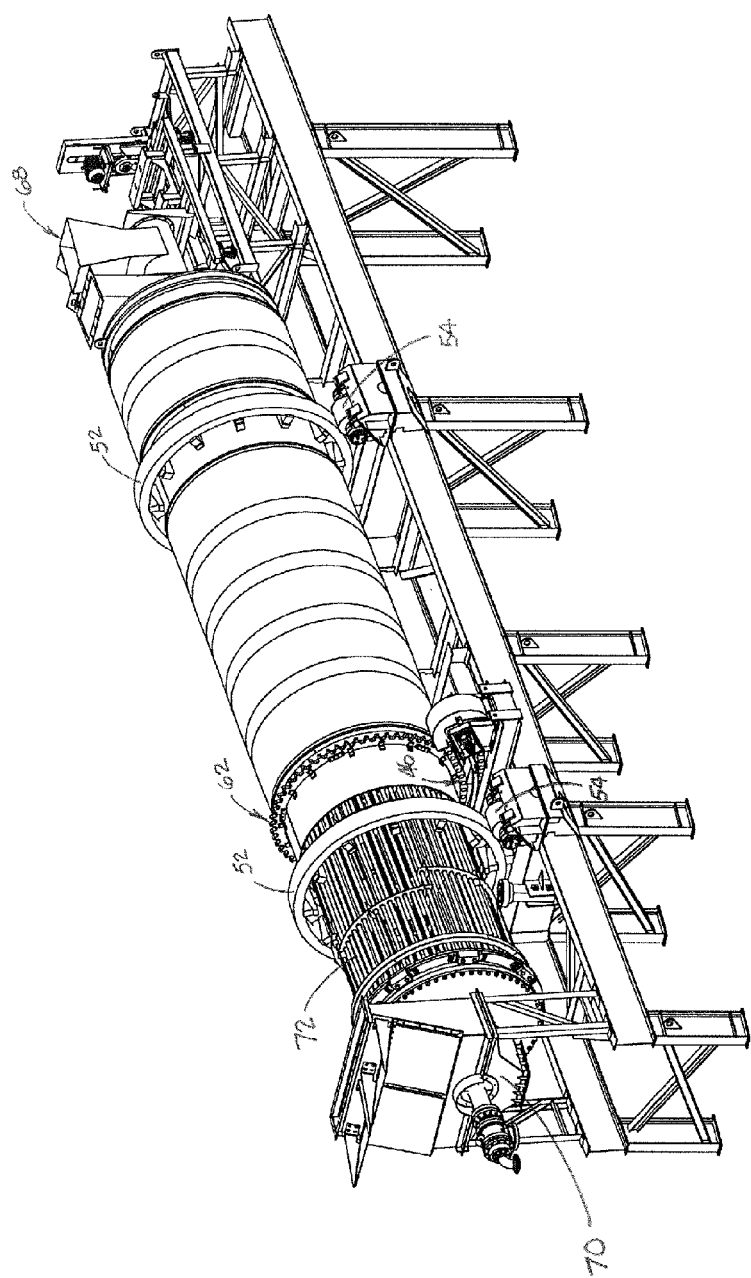
FIG. 5 is a perspective view of the biomass dryer of FIGS. 3 and 4, with a portion of the outer housing of the drying drum removed to show the thermal fluid tubes therein.

Because dryer drum 48 is mounted on frame 42 having upper end 44 and lower end 46, the axis 50 of the drum is oriented downwardly from upper end 64 of dryer drum 48 to lower end 66 of the drum (best shown in FIG. 5). Upper end 64 of dryer drum 48 is provided with inlet 68 for green wood, and lower end 66 is provided with a discharge outlet in the form of chute 70 (best shown in FIGS. 5 and 6). Dryer drum 48 is also provided with a plurality of thermal fluid tubes 72 that extend along the interior of the drum and are adapted to circulate thermal fluid that has been heated by the heating assembly. Thus, heated fluid passes out of thermal fluid outlet 73 of heat exchanger 26 of heating assembly 21 to and through thermal fluid tubes 72 of dryer drum 48 and back into the heat exchanger through thermal fluid inlet 74 (see FIG. 2). Since axis 50 of dryer drum 48 is tilted with respect to the ground on which frame 42 is placed, rotation of the dryer drum will cause green wood introduced into inlet 68 at upper end 64 to tumble and move downwardly towards discharge outlet 70 at lower end 66. As it does so, the green wood will come into contact with thermal fluid tubes 72 multiple times. Because there may be expansion of the thermal fluid as it is heated, an expansion tank 75 (see FIGS. 1 and 3) and an associated pump is provided to withdraw hot thermal fluid from the expansion tank and return it to the thermal fluid circuit as needed.

Figure 6:
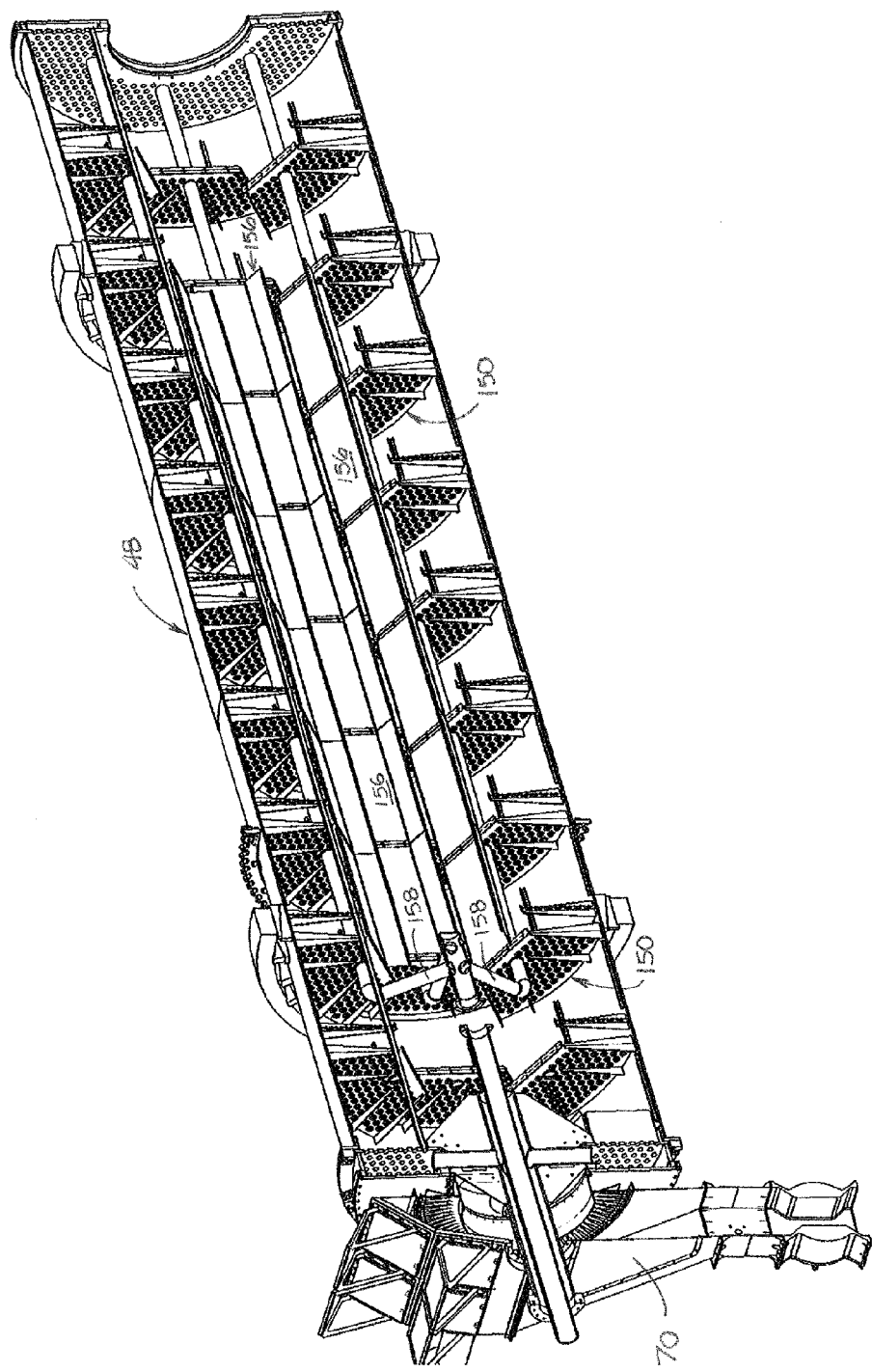
FIG. 6 is a partial sectional view of the biomass dryer of FIGS. 3-5.
Figure 7:
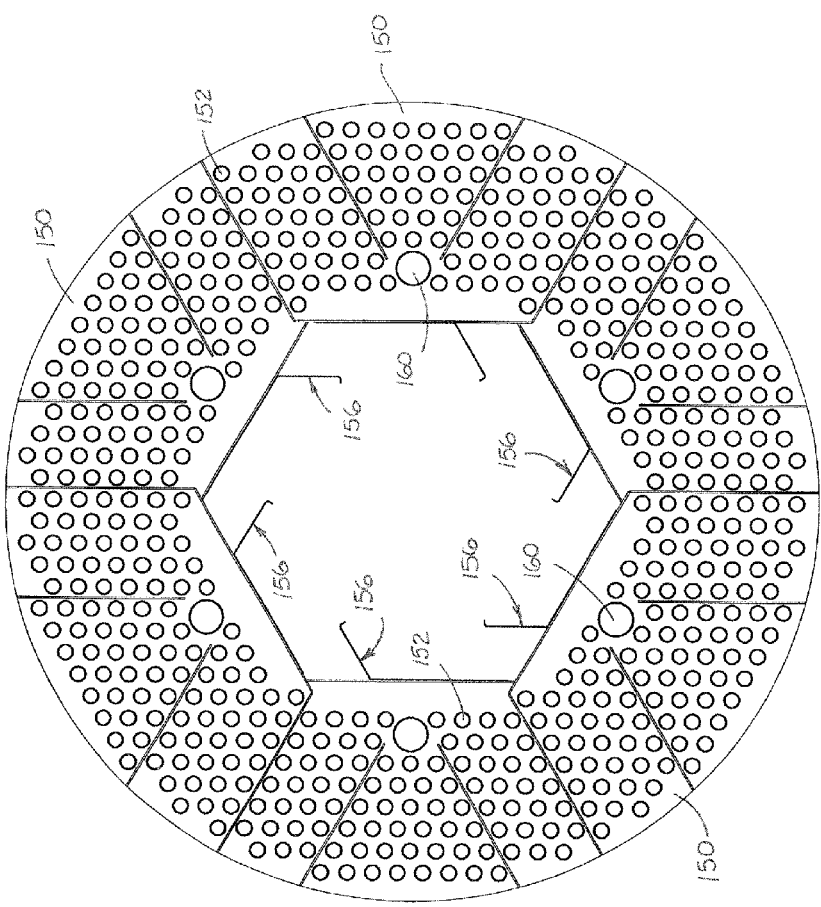
FIG. 7 is an end view of a portion of the biomass dryer of FIGS. 3-6, showing the arrangement of thermal tubes and internal flights therein.

As shown in FIGS. 6 and 7, the thermal fluid tubes of dryer drum 48 are mounted through and supported by a plurality of tube support plates 150 that are spaced along the length of the dryer drum. These support plates include a plurality of tube support holes 152 that support thermal fluid tubes near the periphery of the dryer drum. Support plates 150 also support a plurality of flights or scoops 156 in the central portion of the dryer drum. These scoops 156 capture biomass material that has spilled out of the tube bundle into the central portion of the drum, and they direct such material back into contact with the thermal fluid tubes. The thermal fluid tubes are in fluid communication with a thermal fluid manifold 158 that is supported in manifold support holes 160 in support plates 150, so that thermal fluid can be circulated through the various fluid tubes of the drying assembly.

In converting green (or pre-dried) biomass material to white biomass material in the biomass dryer, it is preferred that the heated thermal fluid be pumped into and through thermal fluid tubes 72 while the dryer drum is rotated at a rate sufficient to convey the green wood introduced into the inlet thereof to the discharge outlet of the dryer drum as it is heated to a temperature of at least about 200° F. Preferably, the dryer drum is of sufficient size and capacity, and is adapted to be rotated at a rate that will provide 40-50 minutes of residence time for biomass material therein.

Figure 8:
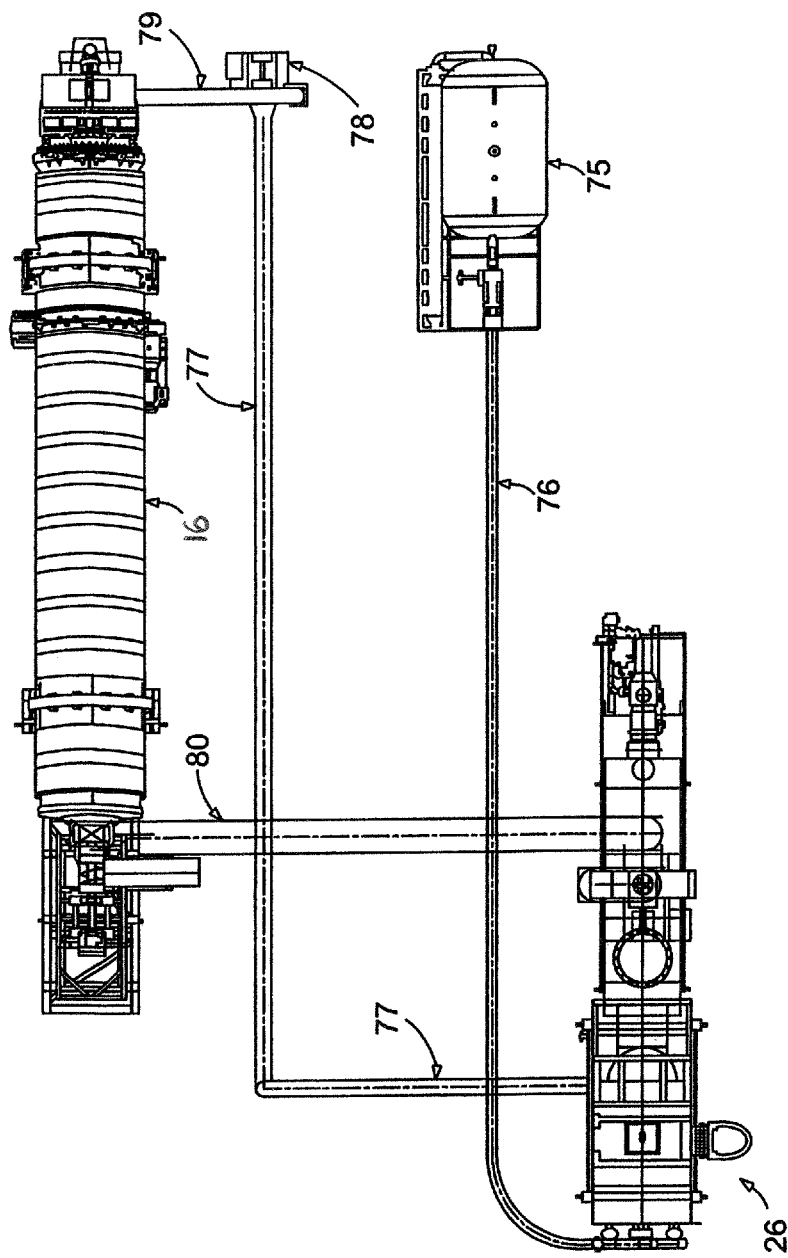
FIG. 8 is a top view, partially in schematic, of a portion of the preferred embodiment of the plant illustrated in FIG. 1, showing the recirculation system by which a portion of the hot, low-oxygen gases from the heat exchanger are recirculated to the dryer drum of the biomass dryer in order to lower the humidity within the dryer drum.

In a preferred embodiment of the invention, the heating assembly includes a recirculation system for recirculating hot, low-oxygen gases from exhaust stack 38 of the heat exchanger to the dryer drum in order to lower the humidity within the dryer drum. As shown in FIG. 8, this recirculation system includes outlet line 77 from the heat exchanger, recirculating fan 78 and inlet line 79 to dryer drum 48. As the drying process is carried out in biomass dryer 16, steam will be produced as the moisture content of the green wood is reduced. This steam will displace air in the drying drum until the oxygen content in the atmosphere of the drum is reduced to below about 9%, and more preferably below about 6%. Steam duct 80 is provided for conveying steam from upper end 64 of dryer drum 48 to combustion chamber 24 of heating assembly 21.

Figure 9:
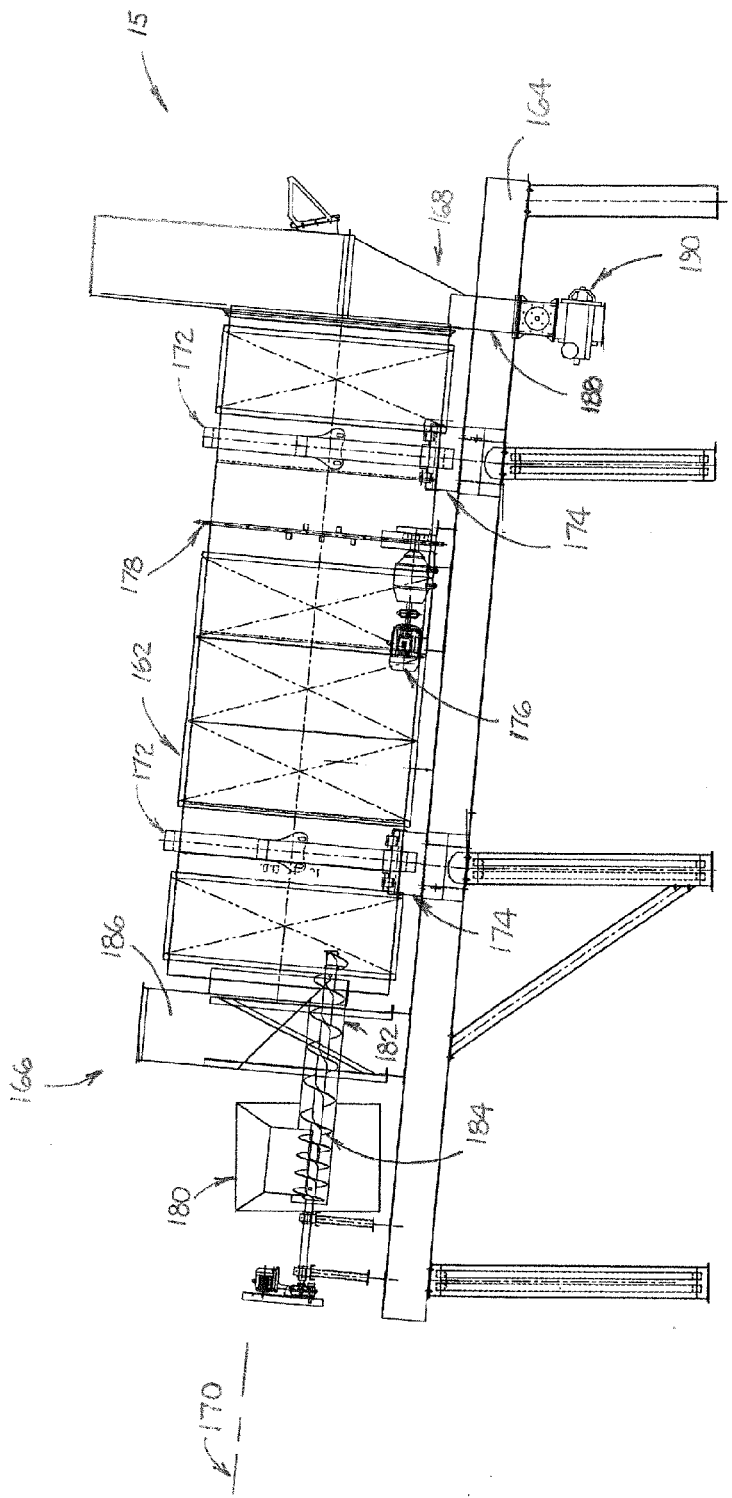
FIG. 9 is a side view, partially in schematic, showing a predryer that may be employed in the plant shown in FIG. 1.

In the preferred embodiment of the invention illustrated in the drawings, predryer 15 is provided to utilize heat from the flue gases passing through exhaust stack 38 of heat exchanger 26 to pre-heat green biomass material prior to its introduction into biomass dryer 16. Once the plant is placed into operation, green biomass materials can be introduced into the predryer. As shown in FIG. 9, predryer 15 comprises an inclined rotating predryer drum 162. The predryer drum is mounted on frame 164 and includes upper end 166 and lower end 168. A rotation system for rotating the predryer drum about its long axis 170 includes a pair of outer rings 172 that engage trunnions 174 on frame 164. Motor 176 is adapted to rotatably drive a sprocket (not shown, but similar to that of dryer drum 48) that is in driving engagement with a drive chain (also not shown) which engages sprocket 178 mounted on the outer surface of the drum to rotate predryer drum 162 in a conventional manner. Hopper 180 is located at upper end 166 of predryer drum 162 and is in communication with inlet chute 182. The hopper is adapted to receive green biomass materials from conveyor 183 (shown in FIG. 1). This green biomass material is pre-dried in the predryer to remove a portion of the moisture contained therein and to raise the temperature of the biomass material.

An auger or screw conveyor 184 is preferably located in inlet chute 182 to convey green biomass material from the hopper into predryer drum 162. Inlet line 186 for exhaust gases from heat exchanger 26 is also located on the upper end 166 of predryer drum 162. During operation of this embodiment of the invention, hot flue gases from the heat exchanger are directed from exhaust stack 38 through pipe 163 (shown in phantom in FIG. 6) and inlet line 186 into the predryer drum so as to flow therethrough parallel to the flow of biomass. Pre-dried biomass is discharged from the lower end 168 of the predryer drum through outlet chute 188 onto conveyor 190 that transports the pre-dried biomass to dryer drum 48 of biomass dryer 16. In this embodiment of the invention, the pre-dried biomass from the outlet chute of the predryer drum is conveyed to inlet 68 of dryer drum 48.

The dryer drum may be rotated at a rate sufficient to convey the pre-dried biomass introduced into the inlet of the dryer drum to the discharge outlet of the dryer drum as it is heated to a temperature sufficient to convert the pre-dried biomass into white wood having a heating value of up to about 8900 BTU/lb. In the alternative, the white wood preparation system may be operated to heat biomass materials in the biomass dryer to a temperature within the range of about 350° F. to about 450° F. to produce lightly torrefied biomass having a heating value within the range of about 8900 BTU/lb to about 9500 BTU/lb. This light torrefaction process results in the generation of a small amount of volatile organic compounds (VOCs) in the dryer drum; however, the predryer captures excess heat from the hot flue gasses produced in heat exchanger 26 and transfers a portion of this excess heat to the green biomass material in the predrying process, thereby increasing the thermal efficiency of the white wood system.

As mentioned above, the preferred torrefied wood system includes torrefaction reactor 18, spray cooler 19 and second hammermill 20. A second predryer (not shown) may also be provided upstream of the torrefaction reactor. Torrefaction reactor 18 is essentially the same as biomass dryer 16, although the torrefied wood system is operated to heat the green biomass material in the torrefaction reactor to a temperature of at least about 475° F. to convert it to torrefied biomass. Torrefaction reactor 18 includes reactor frame 130 (shown in FIGS. 10 and 11) having upper end 131 and lower end 132. Generally cylindrical reactor drum 133 is mounted on reactor frame 130 for rotation about axis 134 (best shown in FIG. 10). Reactor drum 133 includes a pair of outer rings 135 that engage trunnions 136 on reactor frame 130. A motor 138 is adapted to rotatably drive a sprocket (not shown, but located in housing 140) that is in driving engagement with drive chain 142 which engages sprocket 144 mounted on the outer surface of the drum to rotate drum 133 in a conventional manner. Alternative drive systems such as are known to those having ordinary skill in the art to which the invention relates may also be employed to rotate drum 133 with respect to reactor frame 130.

Because reactor drum 133 is mounted on frame 130 having upper end 131 and lower end 132, the axis 134 of the drum is oriented downwardly from upper end 131 to lower end 132. Upper end 131 of reactor drum 133 is provided with inlet 145 for green wood, and lower end 132 is provided with a discharge outlet in the form of chute 146 (similar to chute 70 of drum 48). Inlet 145 is adapted to receive green biomass material from conveyor 147 (shown in FIG. 1). Reactor drum 133 is also provided with a plurality of thermal fluid tubes (not shown, but similar to tubes 72 of drum 48) that extend along the interior of the reactor drum and are adapted to circulate thermal fluid that has been heated by the heating assembly from thermal fluid outlet 73 of heat exchanger 26 of heating assembly 21 to and through the reactor drum and back into the heat exchanger through thermal fluid inlet 74 (see FIG. 2). Since axis 134 of reactor drum 133 is tilted with respect to the ground on which frame 130 is placed, rotation of the reactor drum will cause green wood introduced into inlet 145 at upper end 131 to tumble and move downwardly towards discharge outlet 146 at lower end 132. As it does so, the green wood will come into contact with the thermal fluid tubes in the drum multiple times. Because there may be expansion of the thermal fluid as it is heated, expansion tank 75 (see FIGS. 1 and 3) and an associated pump is provided to withdraw hot thermal fluid from the expansion tank and return it to the thermal fluid circuit as needed.

Because the same heating assembly is used to provide heated thermal fluid to both dryer drum 48 and reactor drum 133, a system of pumps and valves (not shown) such as are known to those having ordinary skill in the art to which the invention relates may be employed to control the rates of delivery of thermal fluid to dryer drum 48 and reactor drum 133. Such a system, along with control of the feed rate of materials into each drum and the rate of rotation thereof, allows the dryer drum to heat materials therein to a temperature lower than that to which materials in the reactor drum are heated.

As the torrefaction process is carried out, steam will be produced as the moisture content of the green biomass material is reduced. This steam will displace air in the reactor drum until the oxygen content in the atmosphere of the drum is reduced to below about 9%, and more preferably below about 6%. In the torrefaction process, this steam will be contaminated with volatile organic compounds. Consequently, steam duct 148 is provided for conveying steam from upper end 131 of reactor drum 133 to combustion chamber 24 of heating assembly 21. Any volatile organic compounds in the steam that is conveyed into the combustion chamber will be incinerated in the combustion chamber, thereby adding to the energy available for heating. In addition, the torrefaction process will strip volatile organic compounds from the off gases of drying in reactor drum 133. Because those volatile organic compounds are heavier than the steam, they will move to lower end 132 of reactor drum 133, where VOC duct 82 is mounted to convey these volatile organic compounds to combustion chamber 24. Like the volatile organic compounds in the steam that is conveyed to the combustion chamber by steam duct 148, the volatile organic compounds in VOC duct 82 will be incinerated in the combustion chamber, and will not pass through exhaust stack 38 of heat exchanger 26.

In one embodiment of the invention, a fuel control mechanism that is a part of the heating assembly may be operated, from control center 84 to control the supply of external fuel to burner 22 at a first rate when the assembly is first placed into operation. Then, as volatile organic compounds are stripped from the biomass in reactor drum 133 and are conveyed to combustion chamber 24, the rate of supply of external fuel to the burner may be reduced to a second rate that is lower than the first rate. It is contemplated that, depending on the type of biomass materials introduced into the reactor drum and the temperature of operation and rate of rotation of the reactor drum, the supply of external fuel to the burner may be shut off and continued heat supplied to the combustion chamber by the incineration of volatile organic compounds therein.

Figure 10:
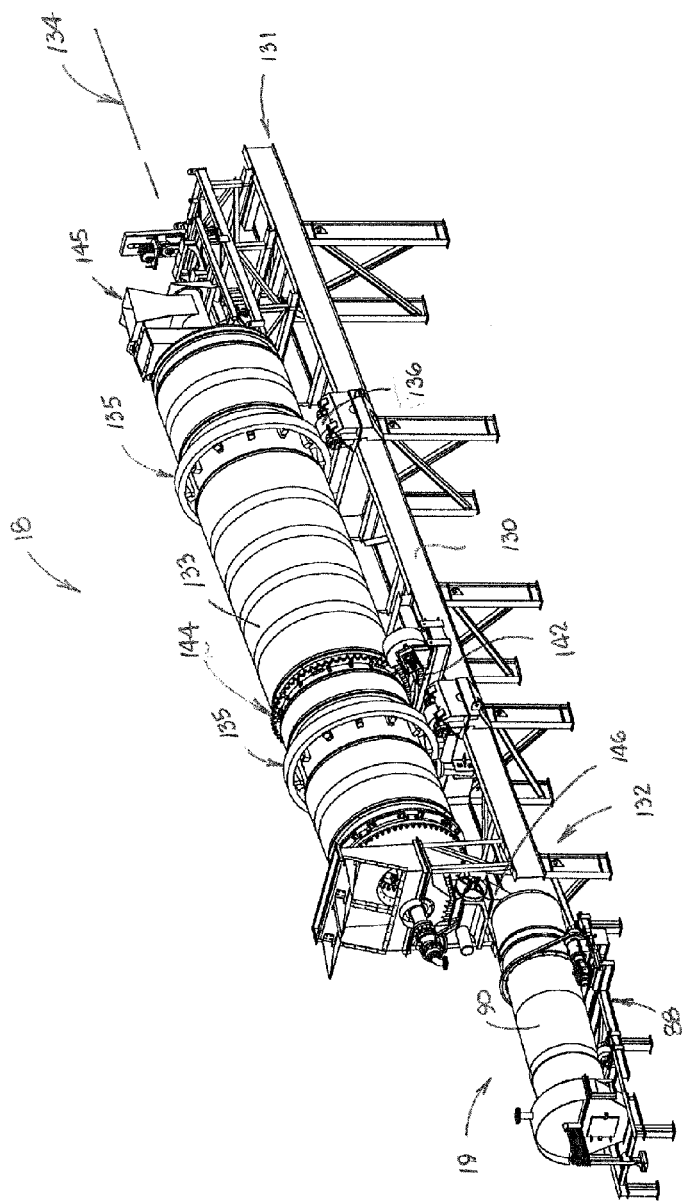
FIG. 10 is a perspective view of the preferred torrefaction reactor and spray cooler of the plant illustrated in FIG. 1.
Figure 11:
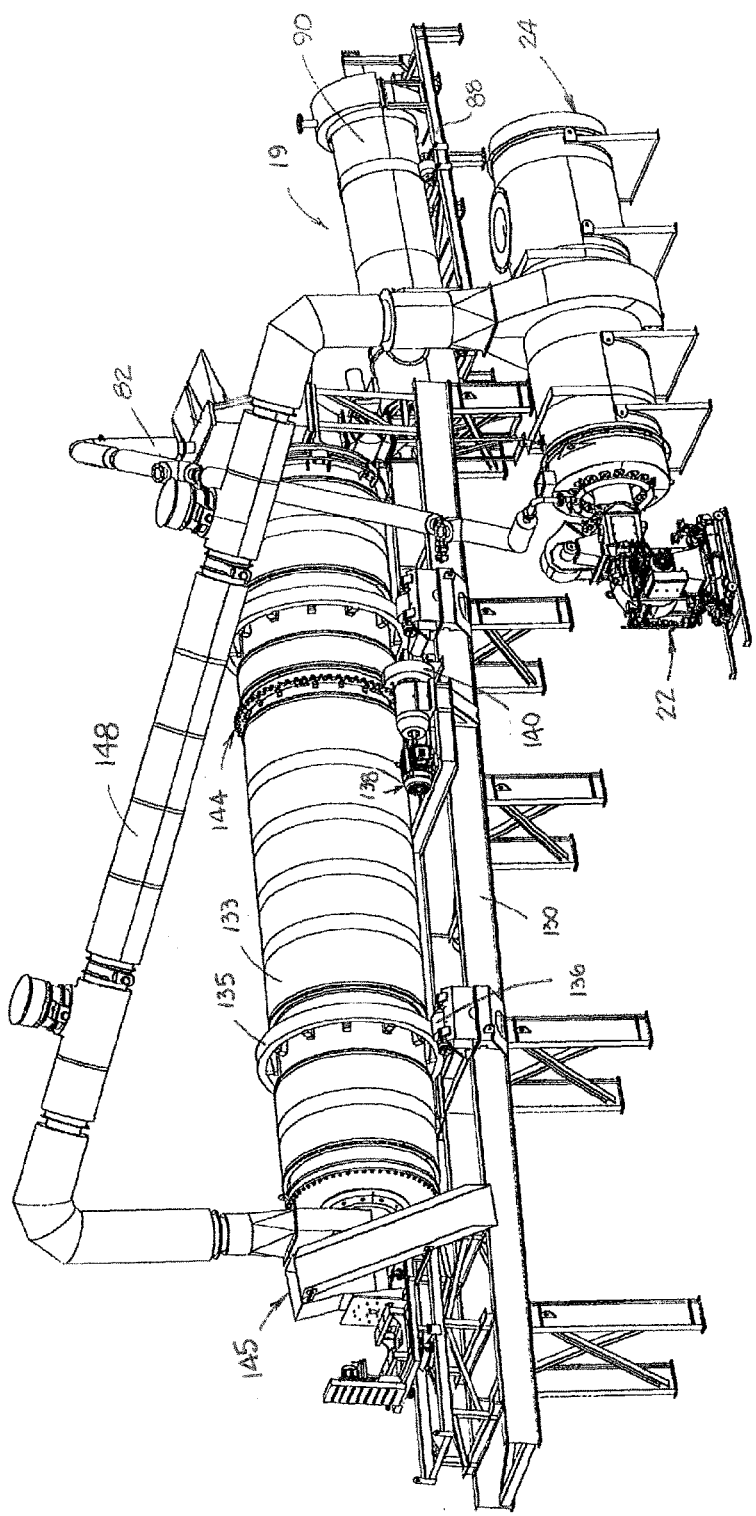
FIG. 11 is a perspective view of the preferred torrefaction reactor and spray cooler and a portion of the preferred heating assembly of the plant illustrated in FIG. 1.

In the embodiment of the invention illustrated in the drawings, the torrefied wood preparation system also includes spray cooler 19 that is preferably located immediately downstream of torrefaction reactor 18, as shown in FIGS. 1, 10 and 11. Spray cooler 19 includes cooler frame 88 and generally cylindrical cooling drum 90. The cooling drum is mounted on the cooler frame for rotation about axis 92 (shown in FIG. 13). Preferred cooling drum 90 includes a pair of bearing rings 94 that engage trunnions 96 on cooler frame 88. Motor 98 (shown in FIGS. 12 and 13) is adapted to rotatably drive sprocket 100 that is in driving engagement with drive chain 102 which engages sprocket 104 mounted on the outer surface of the drum to rotate cooling drum 90. Alternative drive systems such as are known to those having ordinary skill in the art to which the invention relates may also be employed to rotate cooling drum 90 with respect to cooler frame 88.

Figure 14:
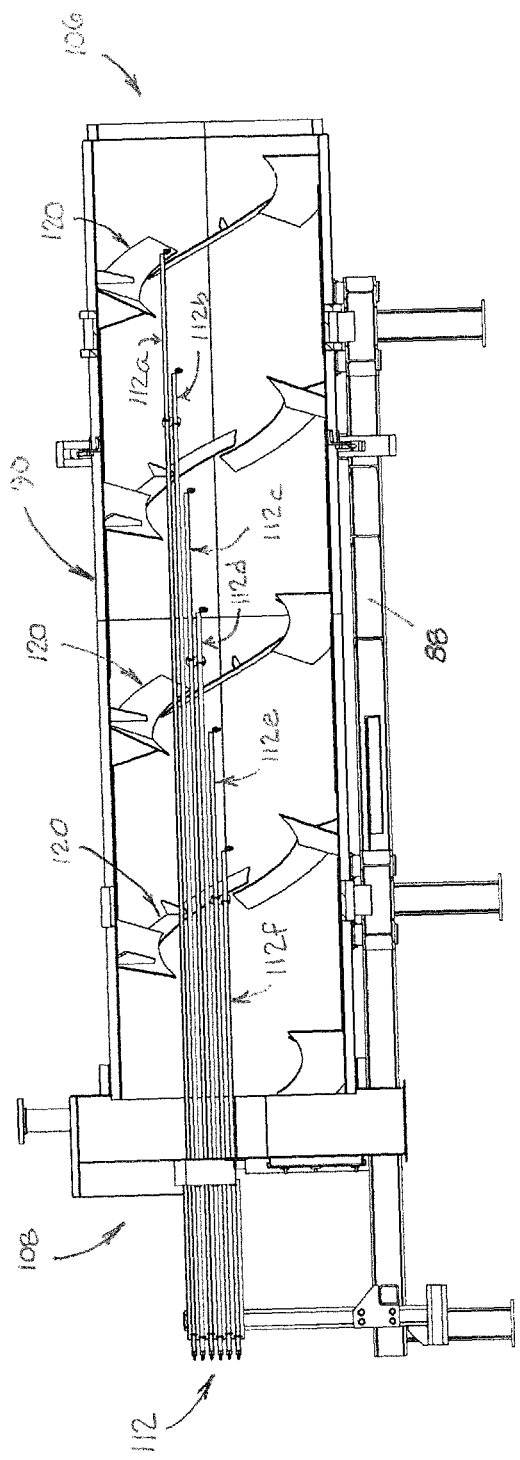
FIG. 14 is a partial sectional view of the preferred spray cooler of FIGS. 12 and 13.

Cooling drum 90 has inlet end 106 with an inlet opening (best shown in FIG. 12) for introduction of torrefied wood discharged from reactor drum 133 through chute 146. The cooling drum also has outlet end 108 with a discharge outlet 110. Preferably, a plurality of cooling tubes 112 extend along the interior of the cooling drum from the outlet end towards the inlet end, as shown in FIG. 14. In the embodiment of the cooling assembly shown in the drawings, six cooling tubes 112 are provided, although any convenient number of cooling tubes could be employed. Preferably, as shown in FIG. 14, each cooling tube 112 has a length that is different from that of each of the other cooling tubes. Thus, cooling tube 112a is longer than all of the other cooling tubes, cooling tube 112b is longer than cooling tubes 112c, 112d, 112e and 112f; cooling tube 112c is longer than cooling tubes 112d, 112e and 112f; cooling tube 112d is longer than cooling tubes 112e and 112f; and cooling tube 112e is longer than cooling tube 112f. Preferably, the end of cooling tube 112a is located approximately 10% of the length of the cooling drum from the inlet end, and the end of cooling tube 112b is located approximately 10% of the length of the cooling drum from the end of cooling tube 112a. Similarly, the end of cooling tube 112c is located approximately 10% of the length of the cooling drum from the end of cooling tube 112b, and the end of cooling tube 112d is located approximately 10% of the length of the cooling drum from the end of cooling tube 112c. In the same manner, the end of cooling tube 112e is located approximately 10% of the length of the cooling drum from the end of cooling tube 112d, and the end of cooling tube 112f is located approximately 10% of the length of the cooling drum from the end of cooling tube 112e. In the preferred embodiment of the invention illustrated in the drawings, each of the five cooling tubes other than the longest one is shorter by approximately 10% of the length of the cooling drum than the next longest cooling tube.

Figure 12:
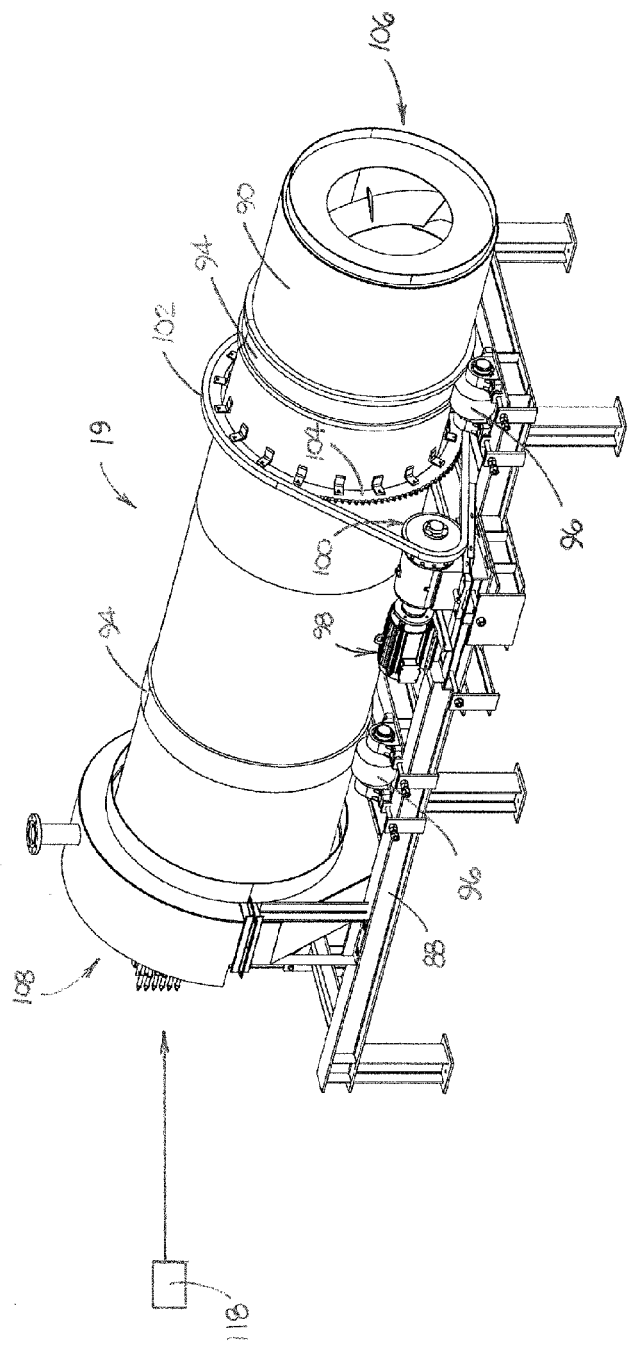
FIG. 12 is a perspective view of the preferred spray cooler of the plant illustrated in FIG. 1.
Figure 13:
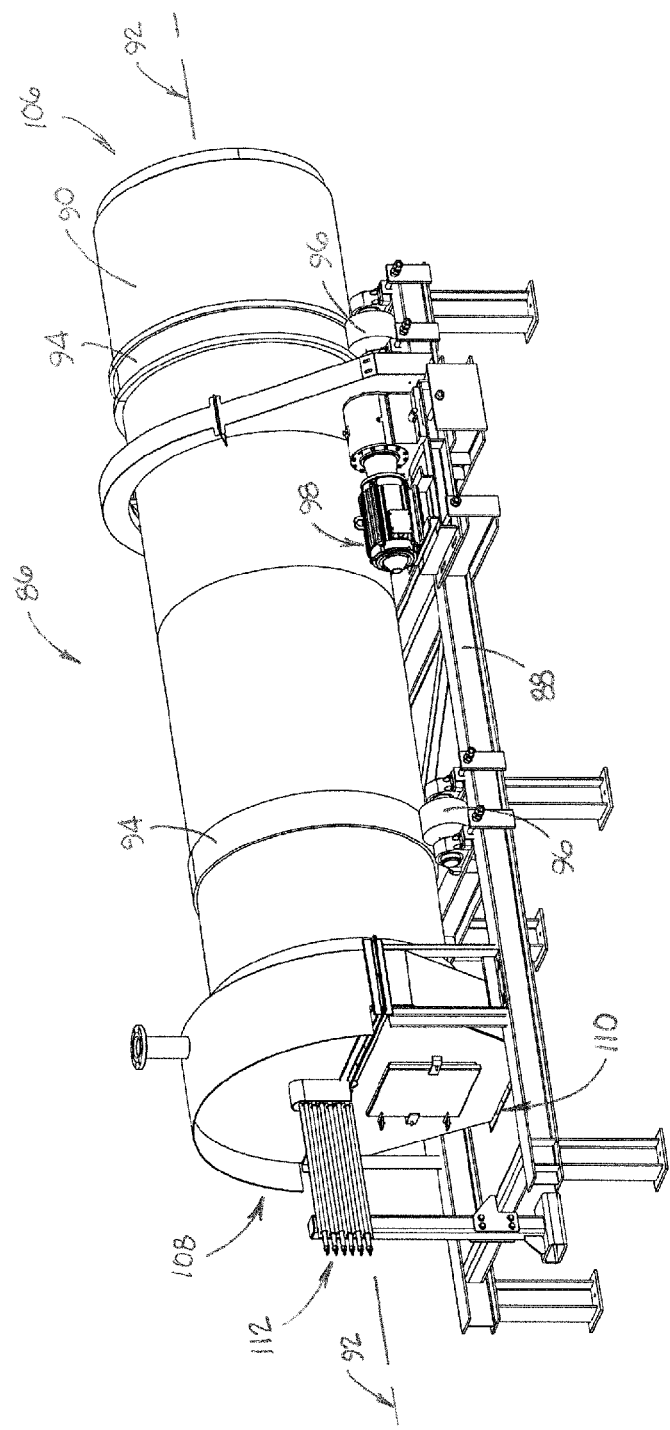
FIG. 13 is an alternate perspective view of the preferred spray cooler of FIG. 12.
Figure 15:
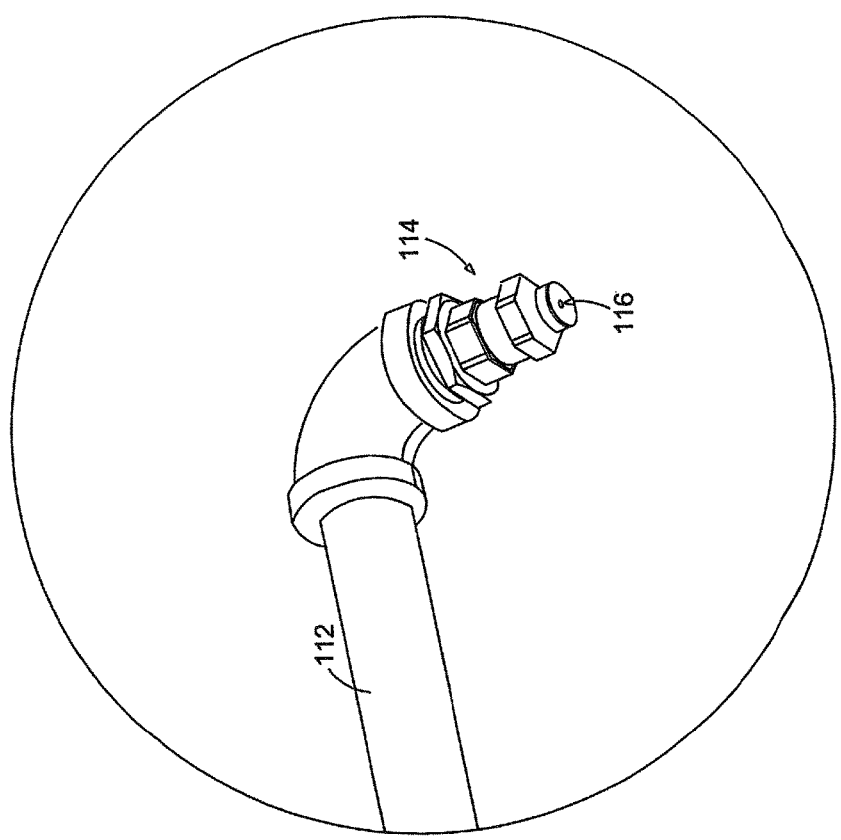
FIG. 15 is a detailed view of a nozzle of the preferred cooling assembly of the plant illustrated in FIG. 1.

As shown in FIG. 15, each cooling tube has a nozzle 114 that is mounted on the end of the cooling tube within the cooling drum. Preferably, each nozzle has a nozzle opening 116 that is configured and arranged to discharge cooling fluid downwardly from the cooling tube, most preferably at an angle of about 90° to the plane of the dynamic angle of repose of the torrefied biomass material in cooling drum 90. Because the preferred arrangement of cooling tubes and nozzles within cooling drum 90 spaces the nozzles along the length of the cooling drum, cooling fluid may be dispensed through the nozzles onto biomass material located throughout the drum. A pump 118, shown schematically in FIG. 12, provides the means for conveying cooling fluid, such as water, through each of the cooling tubes to be discharged through the nozzles. A plurality of flights 120 are mounted on the interior of the cooling drum and arranged to direct material from inlet end 106 to outlet end 108 as the cooling drum is rotated. Preferably, cooling water is discharged from the nozzles of the cooling tubes onto the torrefied wood in the cooling drum in quantities sufficient to reduce the temperature of the torrefied wood without adding additional moisture to the torrefied wood. Furthermore, it is preferred that the cooling fluid be discharged on the torrefied wood in the cooling drum while drum 90 is rotated at a rate so as to reduce the temperature of the torrefied wood at the discharge outlet to a temperature that is less than about 150° F., and more preferably to a temperature that is less than about 130° F.

In other embodiments of the invention, spray cooler 19 may be omitted and replaced by an air-cooling system such as is known to those having ordinary skill in the art to which the invention relates.

In operating the parallel processing assemblies to process green biomass material for pelletizing into a fuel pellet, hammermill 17 is located downstream of the biomass dryer and hammermill 20 is located downstream of spray cooler 19. These hammermills are operated to further reduce the particle size of the white wood and torrefied wood produced before a blend of such materials is delivered to one or more pellet presses 122, which are operated to compress the blend of materials to produce fuel pellets. Preferably, the white wood and the torrefied wood are blended in blending conditioners 124 and 125, and the blends are conveyed to the pellet presses by conveyor or other means. The inventors have discovered that blends of various relative proportions of the two types of processed materials produces pellets having all of the desired properties. Furthermore, the resulting pellets will be generally water-resistant and will not disintegrate if they get wet. It is preferred that a reciprocating pellet press such as the Pellet Pro-4 pelletizer that is sold by Breaker Technology, Inc. of Thornbury, Ontario, Canada be employed as the pellet press. Preferably, the pellet press is operated to compress the blend of white biomass material and torrefied biomass material at a pressure of about 10,000 psi in a die heated to a temperature within the range of about 500° F. to about 530° F. for a period of at least about one second.

In the embodiment of the invention illustrated in the drawings, vented gases (including VOCs) and dust from the pellet presses are collected and conveyed back to combustion chamber 24 where they are incinerated. Insulated or heated ducts, such as duct 126, are provided to convey gases and dust from the pellet presses to combustion chamber 24. Pellets produced in the pellet presses are transported by conveyor 127 to rotary cooler 128 for cooling and then to screen 129. Dust and gases may also be collected downstream from the pellet presses, such as at the entry of conveyor 127 into rotary cooler 128, where another insulated or heated duct, such as duct 192, may be employed to carry gases and dust back to combustion chamber 24 for incineration. Other similar ducts may be provided at other points in the system where gases (especially VOCs) and dust may be collected for conveyance to the combustion chamber.

Although this description contains many specifics, these should not be construed as limiting the scope of the invention but as merely providing illustrations of the presently preferred embodiments thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. An assembly for processing green biomass materials from two separate feed sources for use as a fuel pellet, said assembly comprising:
    (A) a drying assembly for converting green biomass material from a first source to white biomass material;
    (B) a torrefaction assembly for converting green biomass material from a second source to torrefied biomass material;
    (C) a heating assembly comprising:
        (1) a heat exchanger having a plurality of heat transfer coils therein containing a thermal fluid;
        (2) a burner for heating the thermal fluid in the heat transfer coils to a temperature within the range of 200° F. to 550° F., said burner also producing flue gases;
        (3) a combustion chamber that is operatively connected between the burner and the heat exchanger;
        (4) means for conveying heated thermal fluid from the heat exchanger to the drying assembly;
        (5) means for conveying heated thermal fluid from the heat exchanger to the torrefaction assembly;
    (D) a pellet press for pelletizing a blend of biomass materials processed in the drying assembly and biomass materials processed in the torrefaction assembly;
    (E) a VOC duct for conveying gases collected at or downstream from the pellet press to the combustion chamber.

2. The assembly of claim 1 wherein the drying assembly comprises:
    (A) a predryer that is adapted to:
        (1) receive green biomass material from the first source; and
        (2) remove moisture from and raise the temperature of the green biomass material to produce a pre-dried biomass material;
    (B) a biomass dryer that is adapted to:
        (1) receive the pre-dried dried biomass material from the predryer;
        (2) convert the pre-dried biomass material to white biomass material.

3. The assembly of claim 2 which includes a steam duct for conveying steam from the biomass dryer to the combustion chamber.

4. The assembly of claim 2 wherein the biomass dryer comprises:
    (A) a dryer frame having:
        (1) an upper end;
        (2) a lower end;
    (B) a generally cylindrical dryer drum that is mounted on the dryer frame for rotation about the axis of the dryer drum, said dryer drum having:
        (1) an upper end having an inlet;
        (2) a lower end having a discharge outlet;
        (3) a plurality of thermal fluid tubes extending along the interior thereof;
    (C) means for rotating the dryer drum with respect to the dryer frame;
    (D) means for conveying the thermal fluid from the heat exchanger of the heating assembly through the thermal fluid tubes in the dryer drum.

5. The assembly of claim 4 wherein the dryer drum includes:
    (A) a thermal fluid manifold that supplies thermal fluid to the plurality of thermal fluid tubes;
    (B) a plurality of scoops that are located in the central portion of the drum for directing biomass material within the dryer drum into contact with the plurality of thermal fluid tubes;
    (C) a plurality of tube support plates that are spaced along the length of the interior of the dryer drum, each of said tube support plates:
        (1) including a plurality of tube support holes for supporting the plurality of thermal fluid tubes near the periphery of the dryer drum;
        (2) being adapted to support the plurality of scoops in the central portion of the dryer drum.

6. The assembly of claim 4 which includes a recirculation system to recirculate gases from the heat exchanger to the dryer drum, said recirculation system comprising:
(A) an outlet line from the heat exchanger;
(B) an inlet line to the dryer drum; and
(C) a recirculating fan that is in fluid communication with the outlet line from the heat exchanger and the inlet line to the dryer drum.

7. The assembly of claim 1 which includes a VOC duct for conveying volatile organic compounds from the torrefaction assembly to the combustion chamber.

8. The assembly of claim 1 wherein the torrefaction assembly includes a torrefaction reactor comprising:
(A) a reactor frame having:
  (1) an upper end;
  (2) a lower end;
(B) a generally cylindrical reactor drum that is mounted on the reactor frame for rotation about the axis of the reactor drum, said reactor drum having:
  (1) an upper end having an inlet;
  (2) a lower end having a discharge outlet;
  (3) a plurality of thermal fluid tubes extending along the interior thereof;
(C) means for rotating the reactor drum with respect to the reactor frame;
(D) means for conveying the thermal fluid from the heat exchanger of the heating assembly through the thermal fluid tubes in the reactor drum.

9. The assembly of claim 8 wherein the reactor drum includes:
(A) a thermal fluid manifold that supplies thermal fluid to the plurality of thermal fluid tubes;
(B) a plurality of scoops that are located in the central portion of the reactor drum for directing biomass material within the reactor drum into contact with the plurality of thermal fluid tubes;
(C) a plurality of tube support plates that are spaced along the length of the interior of the reactor drum, each of said tube support plates:
  (1) including a plurality of tube support holes for supporting the plurality of thermal fluid tubes near the periphery of the reactor drum;
  (2) being adapted to support the plurality of scoops in the central portion of the reactor drum.

10. The assembly of claim 8 wherein the torrefaction assembly includes:
(A) a cooling assembly located downstream of the torrefaction reactor;
(B) means for conveying torrefied biomass material from the discharge outlet of the reactor drum to the cooling assembly.

11. The assembly of claim 10 wherein the cooling assembly comprises:
(A) a cooler frame;
(B) a generally cylindrical cooling drum that is mounted on the cooler frame for rotation about the axis of the cooling drum, said cooling drum having:
  (1) an inlet end with an inlet;
  (2) an outlet end with a discharge outlet;
  (3) a cooling tube extending along the interior thereof;
  (4) a nozzle mounted on the end of the cooling tube within the cooling drum, which nozzle has a nozzle opening that is configured and arranged to discharge cooling fluid downwardly from the cooling tube;
  (5) a plurality of flights mounted on the interior of the cooling drum and arranged to direct material from the inlet end to the outlet end as the cooling drum is rotated;
(C) means for rotating the cooling drum with respect to the cooler frame;
(D) means for conveying cooling fluid through the cooling tube to be discharged through the nozzle.

12. The assembly of claim 11 wherein the cooling assembly comprises:
(A) a plurality of cooling tubes extending along the interior of the cooling drum, each of which has a length that is different from that of each of the other cooling tubes;
(B) a plurality of nozzles, with at least one nozzle being mounted on the end of each of the cooling tubes within the cooling drum;
(C) means for conveying cooling fluid through each of the cooling tubes to be discharged through the nozzles.

13. The assembly of claim 12 wherein each of the nozzles is oriented so as to direct the cooling fluid downwardly at an angle of approximately 90° to the plane of the dynamic angle of repose of the biomass material in the cooling drum.

14. The assembly of claim 12 wherein the end of of the longest cooling tube is spaced approximately 10% of the length of the cooling drum from the inlet thereof, and each of the cooling tubes other than the longest one is shorter by approximately 10% of the length of the cooling drum than the next longest cooling tube.

15. An assembly for processing green biomass materials from two separate feed sources for use as a fuel pellet, said assembly comprising:
(A) a predryer that is adapted to receive green biomass material from a first feed source and remove moisture from and raise the temperature of the green biomass material to produce a pre-dried biomass material;
(B) a drying assembly for converting pre-dried biomass material obtained from the predryer to white biomass material;
(C) a torrefaction assembly for converting green biomass material from a second source to torrefied biomass material;
(D) a heating assembly comprising:
  (1) a heat exchanger having a plurality of heat transfer coils therein containing a thermal fluid;
  (2) a burner for heating the thermal fluid in the transfer coils to a temperature within the range of 200° F. to 550° F., said burner also producing flue gases;
  (3) means for conveying heated thermal fluid from the heat exchanger to the drying assembly;
  (4) means for conveying heated thermal fluid from the heat exchanger to the torrefaction assembly;
  (5) an exhaust stack for the flue gases;
(E) means for conveying flue gases from the exhaust stack to the predryer.

16. The assembly of claim 15 wherein the predryer comprises:
(A) an inclined rotating predryer drum, said drum having:
  (1) an upper end;
  (2) a lower end;
  (3) a long axis;
  (3) a rotation system for rotating the drum about its long axis;
(B) an inlet chute for green biomass material located at the upper end of the predryer drum;
(C) an inlet line for exhaust gases from the heat exchanger located at the upper end of the predryer drum, so that hot flue gases from the heat exchanger are directed into the predryer drum so as to flow therethrough parallel to the flow of biomass;

(D) an outlet for pre-dried biomass located at the lower end of the predryer drum.

\* \* \* \* \*